United States Patent [19]

Fry

[11] 4,223,910
[45] Sep. 23, 1980

[54] VEHICLE SUSPENSIONS

[75] Inventor: Timothy S. Fry, Dunchurch, England

[73] Assignee: GKN Group Services Limited, Warley, England

[21] Appl. No.: 930,177

[22] Filed: Aug. 2, 1978

[30] Foreign Application Priority Data

Aug. 13, 1977 [GB] United Kingdom ............... 34078/77
Feb. 15, 1978 [GB] United Kingdom ................. 5937/78

[51] Int. Cl.³ .............................................. B62D 7/00
[52] U.S. Cl. ............................ 280/660; 180/73 TL; 280/688
[58] Field of Search ............... 280/724, 725, 709, 711, 280/693, 696, 701, 698, 663, 660, 688, 689, 95 R; 180/73 TL, 245

[56] References Cited

U.S. PATENT DOCUMENTS

| 1,856,831 | 5/1932 | Guy | 180/245 |
| 2,634,986 | 4/1953 | McDaniel | 280/724 |
| 2,994,396 | 8/1961 | Bidwell | 280/711 |
| 3,087,742 | 4/1963 | Müller | 280/701 |
| 4,087,116 | 5/1978 | Morimoto | 280/724 |

FOREIGN PATENT DOCUMENTS 814306 6/1959 United Kingdom.

Primary Examiner—Robert R. Song
Attorney, Agent, or Firm—Merriam, Marshall & Bicknell

[57] ABSTRACT

An axle assembly for a road vehicle comprising a beam constrained at its center against movement transversely of the vehicle but permitted universal pivoting movement, and having at each end a spindle which carries a hub, an upwardly extending arm and at least one radius rod connected to each arm remote from the spindle. The beam may be constrained by a V-shaped link having its apex universally jointed to the axle beam and its base pivotally connected to the vehicle chassis.

9 Claims, 6 Drawing Figures

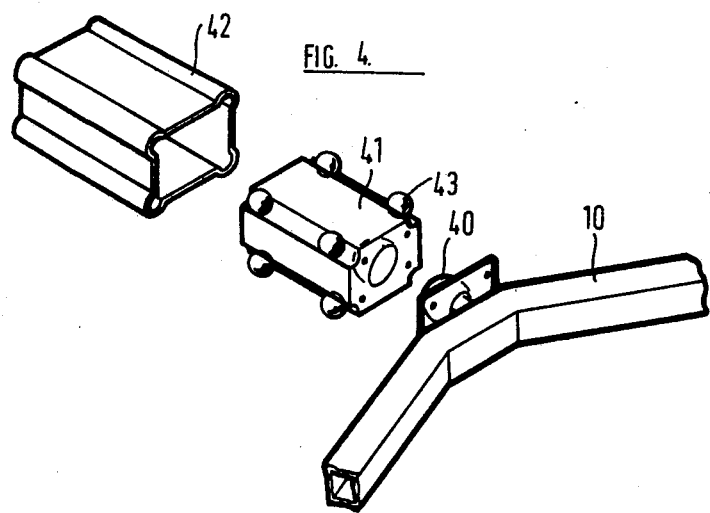

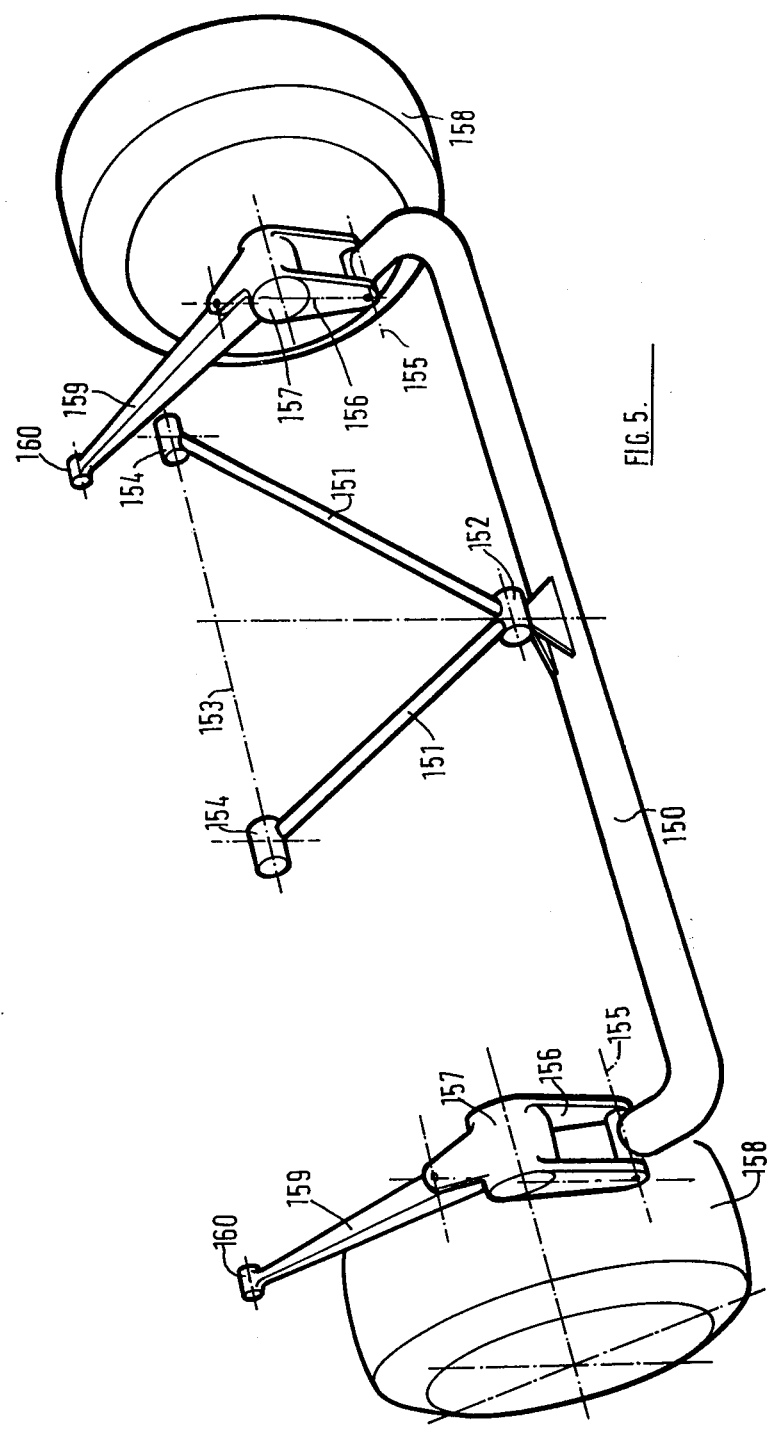

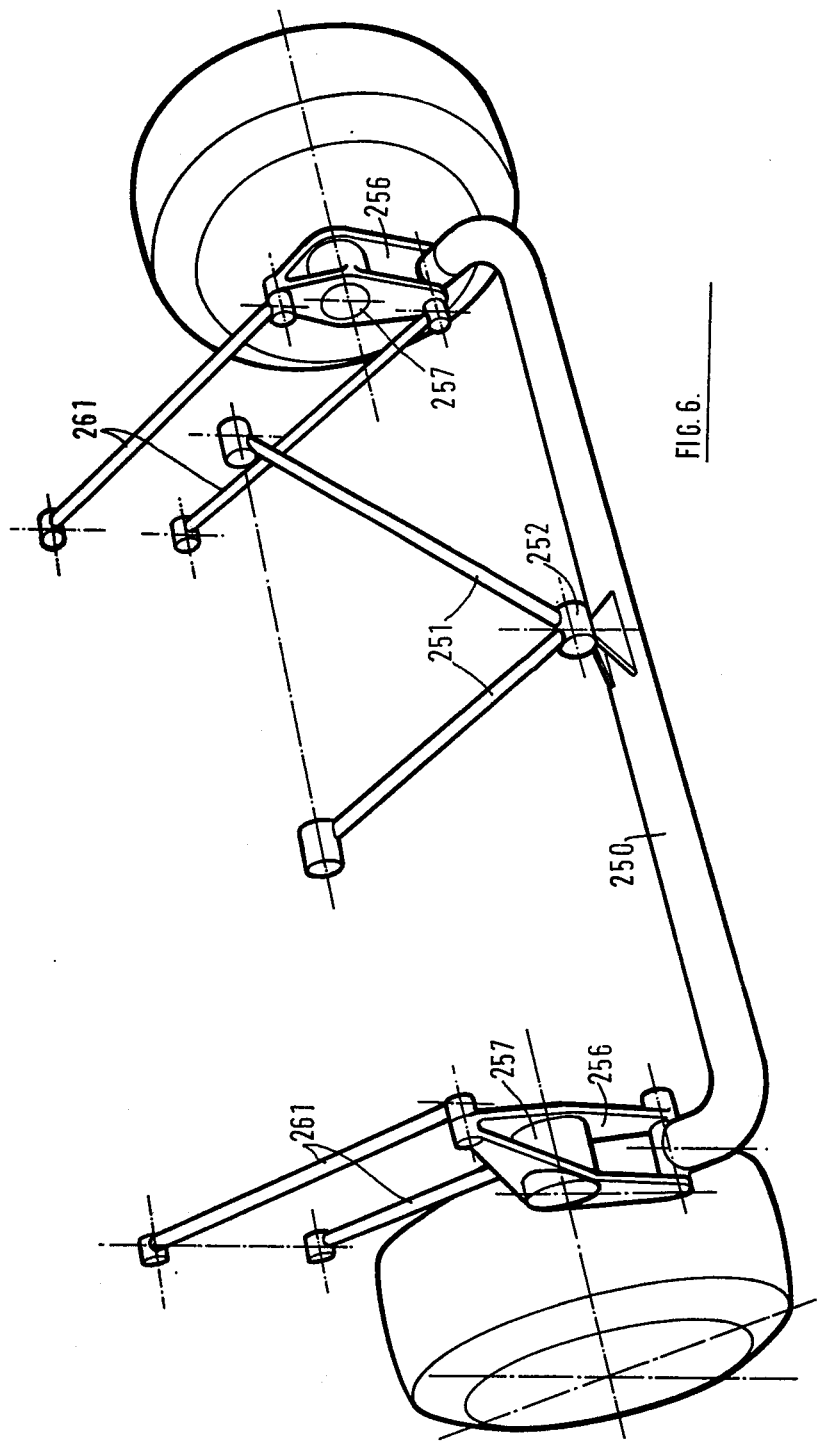

VEHICLE SUSPENSIONS

BACKGROUND OF THE INVENTION

1. Field of the Invention

This invention relates to axle assemblies for road vehicles.

2. Summary of the Invention

According to the invention, we provide an axle assembly for a road vehicle, comprising an axle beam having oppositely disposed limbs, means constraining the centre of the axle beam to translatory movement in a plane extending fore and aft of the vehicle while permitting universal pivoting of the axle beam, aligned spindles received in the end portions of the limbs of the beam to extend transversely of the vehicle, a hub carried by each spindle, an arm carried by each spindle extending generally upwardly therefrom, and at least one radius rod on each side of the vehicle, the or one radius rod being connected to each arm at a position remote from the spindle.

The means constraining the centre of the axle may comprise a V shaped link having its apex connected to the axle beam adjacent the centre thereof by a universal coupling, and its base pivotally connected to the chassis of of the vehicle for movement about an axis extending transversely of the vehicle.

Preferably an upper and a lower radius rod is provided at each side of the vehicle, a lower radius rod on each side being connected to the axle assembly adjacent to the spindle on that side and the other radius rod being connected to the arm on that side at its upper end remote from the spindle.

Each arm extends inboardly of the vehicle chassis and at an inclination to the longitudinal axis of the spindle. The spindle, the arm and a further vertical link may form a triangular arrangement.

The hubs can be driven by shafts extending between them and gearboxes on hubs carried by the spindles. The gearboxes (which may be of any desired ratio) will normally contain bevel gears so that the hubs can be driven from shafts extending generally longitudinally of the vehicle. Alternatively the hubs are driven from separate shafts connected to a differential final drive, the shaft extending, for example, obliquely to the centre line of the vehicle.

The hubs may be steered. For this purpose, the spindles on which the hubs are mounted may be hollow and may have control rods located therein, the control rods being connected to track rods which pass out of the spindles through slots in the walls thereof and which are connected to the hubs by steering arms. Steering is effected by moving the control rods longitudinally within the spindles. The control rods may project inwardly from the spindles and be controlled by separate quadrants or pinions so as to leave a clear space between the limbs of the axle beam in which the engine and/or gearbox of the vehicle can be accommodated.

If desired, the hollow spindles may form cylinders for pistons and be connected to a source of hydraulic fluid so as to provide a power steering arrangement.

BRIEF DESCRIPTION OF THE DRAWINGS

The invention will now be described in detail by way of example with reference to the accompanying diagrammatic drawings in which:

FIG. 4 shows a modification of part of the axle assembly of FIG. 1;

FIG. 5 is a perspective view of another form of axle assembly embodying the invention;

FIG. 6 is a perspective view of yet another form of axle assembly embodying the invention.

DESCRIPTION OF THE PREFERRED EMBODIMENTS

Figure 1:
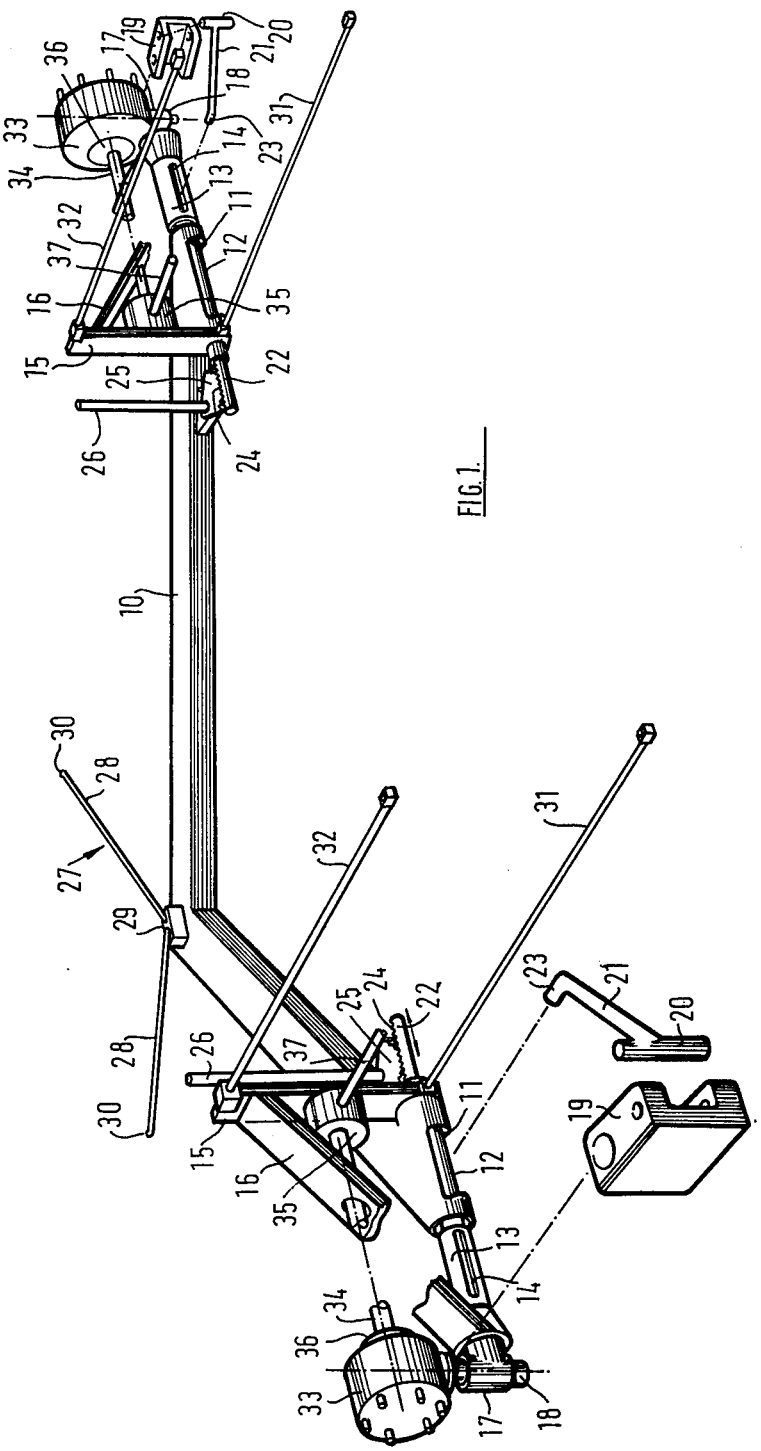
FIG. 1 is an exploded perspective view of a driven and steerable axle assembly embodying the invention.

Referring now to FIG. 1, the axle assembly comprises an axle beam 10 of V-shape having, at its ends, aligned bores 11 which contain bearings. The bores are slotted at 12 and are arranged to extend transversely of the vehicle.

Received in the bearings in each bore 11 is a spindle 13, each spindle being slotted at 14 and being hollow. The inner end of each spindle is connected to a vertical link 15 and a triangulating arm 16 extends from the outer end of the spindle to the link 15. At its outer end, each spindle has a bush 17 in which is received a king pin 18. Mounted on the king pin 18 at each end of the axle is a channel-section steering arm 19. The trailing end of the arm 19 is connected to a pin 20 at the outer end of a track rod 21. The inner ends 23 of the track rods pass through the slots 12 at the ends of the axle beam and through the slots 14 in the spindles 13. Slidable within the bore in each spindle 13 is a control rod 22 and to these control rods are pivoted the inner ends 23 of the track rods 21. Transverse movement of the control rods 22 will cause steering movement of the steering arms 19 via the track rods. One way of moving the control rods 22 is by forming them as racks at 24 and engaging these racks with separate quadrants 25 driven by shafts 26 journalled in lugs on the axle beam. By having separate control rods 22, a space is provided between the inner ends thereof to give clearance, for example, to an engine or other item of equipment on the vehicle. If desired, however, the control rods 22 could be connected or formed as a single rod controlled by a single quadrant. Instead of quadrants, pinions could be used or levers could be provided on the ends of the control rods connected via ball joints to control means.

The axle assembly is located by a V-shaped link 27 having arms 28 connected together at an apex which is connected via a universal joint (29) to the apex of the axle beam 10. The other ends 30 of the V-shaped link are connected via universal joints to parts of the vehicle chassis. The link thus locates the axle beam transversely of the vehicle. In addition, there are upper and lower radius rods on each side. Thus there are lower radius rods 31 which are connected via universal joints to the lower ends of the links 15 adjacent to the spindles 13. The radius rods 31 are connected either to the links 15 or to the ends of the axle beam via universal joints at locations adjacent to the spindles. The upper radius rods are indicated at 32 and are connected via universal joints to the upper ends of the arms 16, in the present example via the links 15. The links 15 could be omitted in which case the rods 32 would be connected directly to the arms 16. The radius rods control the pitch centre of the axle assembly and take torque reaction from braking.

Mounted on each king pin 18 is a driven hub 33. Each hub is driven via a shaft 34. Each shaft extends between the hub 33 and a bevel gearbox 35 mounted on link 15. There is a constant velocity universal joint 36 at the outer end of each shaft. The shafts 34 pass through holes in the arms 16.

The hubs may include epicyclic hub reduction gears and will carry road wheels. The bevel gearboxes 35 are driven via longitudinal shafts, one of which is indicated at 37. The gearboxes 35 could be omitted and the hubs driven by shafts whose inner ends are connected to a differential final drive mechanism.

Figure 3:
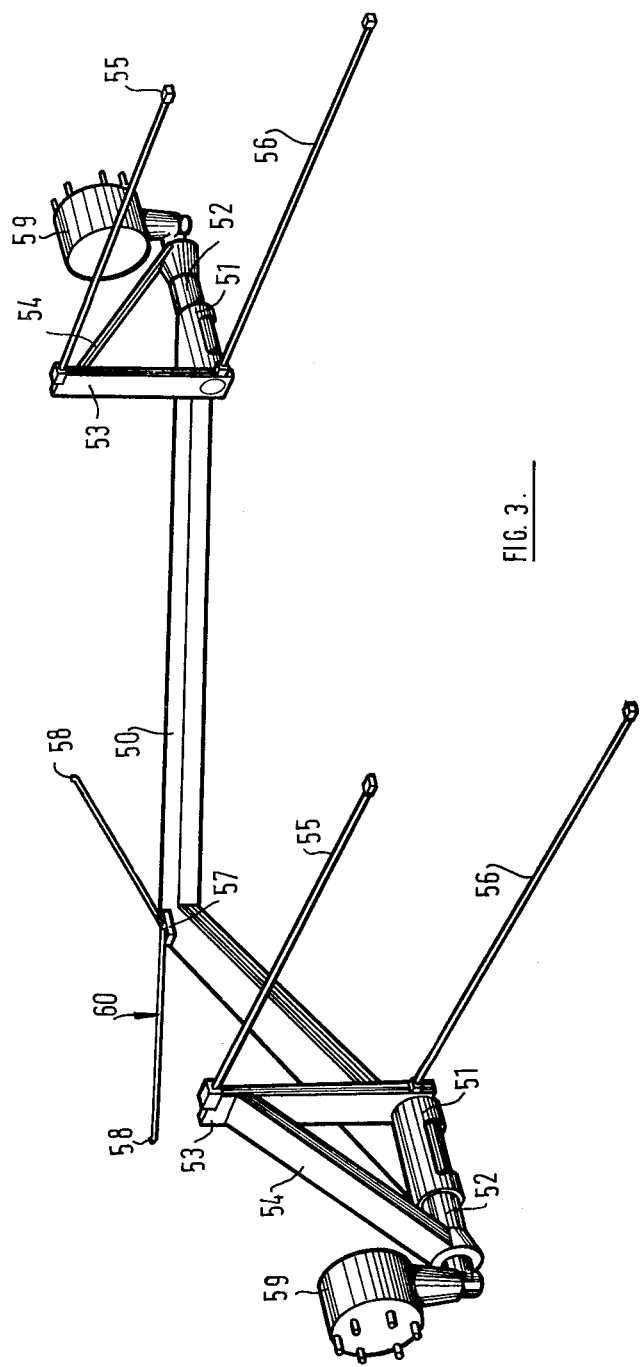
FIG. 3 is a perspective view of a non-steerable, non-driven axle embodying the invention.

FIG. 3 shows a non-steered axle. Referring to FIG. 3, there is again a V-shaped axle beam 50 which at its end has bearings 51. In each bearing is mounted a spindle 52. At the outer end of each spindle is secured an oblique arm 54 which is triangulated with the spindle by means of a vertical link 53. Upper and lower radius rods 55 and 56 are provided on each side extending longitudinally of the vehicle and controlling the pitch centre. As before, the radius rods 56 are connected to the links 53 or to the axle beam 50 adjacent to the spindles 52 whereas the radius arms 55 are connected to the upper ends of the arms 54 via the links 53. Hubs 59 are mounted on the ends of the axle. A V-shaped link is connected to the apex of the axle beam by means of a universal joint 57 and the ends of the link 60 are connected at 58 to the vehicle chassis via universal joints. The links 53 may be omitted and the radius rods 55 connected directly to the upper ends of the arms 54.

In either embodiment of the axle may be sprung by spring legs acting on the axle beam 10 or 50. Preferably the line of action of each spring will pass through the line between the universal joint 29 or 57 and the plan centre line of each wheel carried by the axle. Where centre point steering is provided this centre line is coincident with the pivot axis of the hub in FIG. 1.

The steerable axle could be steered by means of a generally vertical telescopic shaft having one end on the transverse axis through the universal joint 29 with the shaft extending perpendicular to said transverse axis. One could have a bevel steering box at the upper end of this telescopic shaft. The lower end of the shaft should preferably be on the transverse axis through the universal joint 29 but may be slightly off said axis and would be connected, in the embodiment of FIGS. 1 and 2, to the quadrants 25.

Referring now to FIG. 4 of the drawings, there is shown an arrangement, as an alternative to the V-shaped link 27, for locating the axle beam transversely of the vehicle. In this arrangement, the axle beam, 10, is connected by way of a ball (universal) joint 40 to a block 41 slideable longitudinally within a member 42 by suitable bearings, e.g. ball bearings 43. The member 42 is secured to the chassis of the vehicle with the direction of sliding of the block 41 extending longitudinally of the vehicle, thereby constraining the axle beam against movement laterally of the vehicle. The axle beam is, however, still capable of the universal pivoting movement about its centre as in the embodiments of FIGS. 1 to 3.

Referring now to FIG. 5 of the drawings, the axle assembly there illustrated comprises an axle beam 150 in the form of a tube, hereafter referred to as a de Dion tube, which is generally U-shape and is supported relative to the chassis of the vehicle by two links 151 in a V formation, which links are universally pivotally connected to the actual beam by a universal joint 152 and pivotally connected for angular movement about an axis 153 transverse to the longitudinal axis of the vehicle by pivoting connections 154. The universal joint 152 provides a roll centre for the de Dion tube 150, and the position of such roll centre can be adjusted to suit the required characteristics of the vehicle by altering the lengths of the links 151 and of the parallel end portion of the de Dion tube, and enables the roll centre to be positioned irrespective of whether or not there is an adjacent rigid part of the vehicle body or chassis against which lateral forces on the de Dion tube can react.

The free ends of the de Dion tube are pivotally connected, for movement about aligned axes 155 transverse to the length of the vehicle, to generally vertically extending arms 156 which carry mountings 157 for wheels 158. Radius rods in the form of struts 159 which are pivoted to the wheel mountings 157 in the vertical plane and to the body or chassis of the vehicle by pivots 160 which provide for pivoting about axis transverse to the fore and aft axis of the vehicle.

Referring now to FIG. 6, there is illustrated an axle assembly of which parts corresponding to parts in the assembly of FIG. 5 are indicated by the same reference numeral with the addition of 100. Thus, the axle assembly comprises a de Dion tube 250, links 251, upwardly extending arms 256 pivotally connected to the de Dion tube. In this case, however, the arms 256 are supported by two pairs of radius rods 261, the rods of each pair being provided at the upper and lower ends of the arms 256 and the wheel supports 257 being between the points of attachment of the radius rods 261. The radius rods are universally pivotally connected to the body or chassis of the vehicle and to the arms 256, to allow for rolling motion of the de Dion tube 250 about universal joint 252.

The linkages of FIGS. 5 and 6 may also be applied to axle assemblies incorporating steerable wheels, and/or wheels which are driven, e.g. from universally jointed shafts mounted on the body or chassis of the vehicle between the wheels. The axle assembly may be sprung by springs operating on the axle beam.

Figure 2:
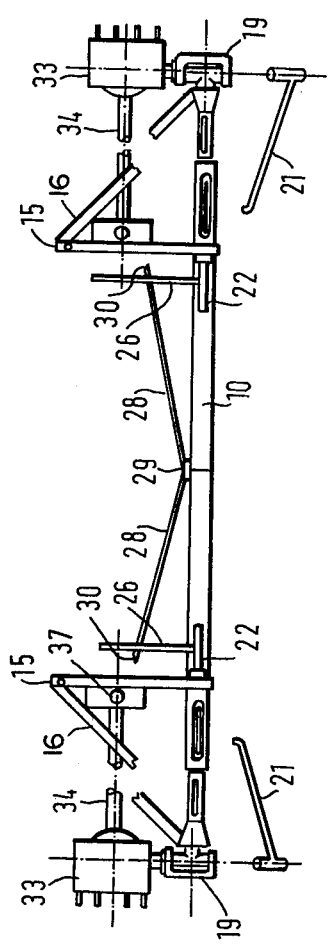
FIG. 2 is a front view of the axle assembly of FIG. 1 with certain parts broken away.

Although as illustrated in FIGS. 1 and 2 of the drawings the hubs of the axle assembly are steered by track rods 21 connected to control rods slidable within the bores of spindles 13, the hubs may be steered by other means. For example, a conventional steering rack could be employed, connected by conventional track rods directly to the steering arms.

I claim:

1. An axle assembly for a road vehicle, comprising an axle beam having oppositely disposed limbs; means constraining the centre of the axle beam to translatory movement in a plane extending force and aft of the vehicle while permitting universal pivoting of the axle beam; aligned hollow spindles received in the end portions of the limbs of the beam to extend transversely of the vehicle; a hub carried by each spindle; an arm carried by each spindle extending generally upwardly therefrom, at least one radius rod on each side of the vehicle, each said one radius rod being connected to its associated arm at a position remote from the spindle, control rods located in the spindles, the control rods being connected to track rods which pass out of the spindles through slots in the walls thereof and are connected to the hubs by steering arms for effecting steering of the hubs upon movement of the control rods longitudinally within the spindles.

2. An assembly according to claim 1 wherein the control rods project inwardly from the spindles and are controlled separately, thus leaving a clear space between the limbs of the axle beam.

3. An axle assembly for a road vehicle, comprising an axle beam having oppositely disposed limbs; means constraining the centre of the axle beam to translatory movement in a plane extending fore and aft of the vehicle while permitting universal pivoting of the axle beam; aligned spindles received in the end portions of the limbs of the beam to extend transversely of the vehicle; a hub carried by each spindle; an arm carried by each spindle extending generally upwardly therefrom, and an upper and a lower radius rod on each side of the vehicle, the lower radius rod on each side being pivotally connected to the axle assembly adjacent the spindle on that side and the upper radius rod being pivotally connected to the arm on that side at its upper end remote from the spindle, the other ends of the radius rods being connected to the vehicle structure.

4. An assembly according to claim 3 wherein the means constraining the centre of the axle comprises a Vshaped link having its apex connected to the axle beam adjacent the centre thereof by a universal coupling and its base pivotally connected to the chassis of the vehicle for movement about an axis extending transversely of the vehicle.

5. An assembly according to claim 3 wherein each arm extends inboardly of the vehicle structure and at an inclination to the longitudinal axis of the spindle.

6. An assembly according to claim 5 wherein each spindle arm and a further vertical link form a triangular arrangement.

7. An assembly according to claim 3 wherein the spindles are hollow and have control rods located therein, the control rods being connected to track rods which pass out of the spindles through slots in the walls thereof and are connected to the hubs by steering arms for effecting steering of the hubs upon movement of the control rods longitudinally within the spindles.

8. An assembly according to claim 7 wherein the control rods project inwardly from the spindles and are controlled separately, thus leaving a clear space between the limbs of the axle beam.

9. An assembly according to claim 3 wherein the hubs are driven by shafts extending between them and bevel gear boxes carried by the spindles, providing for right angle drive between shafts extending longitudinally of the vehicle and the hubs.

* * * * *